(12) United States Patent
Wang et al.

(10) Patent No.: US 12,013,583 B2
(45) Date of Patent: Jun. 18, 2024

(54) OPTICAL TRANSCEIVER WITH SEPARATED HEAT DISSIPATION COMPONENTS

(71) Applicant: Prime World International Holdings Ltd., New Taipei (TW)

(72) Inventors: Yi-Ju Wang, New Taipei (TW); Ming-You Lai, New Taipei (TW); Che-Shou Yeh, New Taipei (CN)

(73) Assignee: Prime World International Holdings Ltd., New Taipei (TW)

( * ) Notice: Subject to any disclaimer, the term of this patent is extended or adjusted under 35 U.S.C. 154(b) by 134 days.

(21) Appl. No.: 17/591,578

(22) Filed: Feb. 2, 2022

(65) Prior Publication Data
US 2023/0244048 A1 Aug. 3, 2023

(51) Int. Cl.
*G02B 6/42* (2006.01)
*H04B 10/40* (2013.01)

(52) U.S. Cl.
CPC ......... *G02B 6/4272* (2013.01); *G02B 6/4246* (2013.01); *G02B 6/4269* (2013.01); *H04B 10/40* (2013.01)

(58) Field of Classification Search
CPC .. G02B 6/4268; G02B 6/4269; G02B 6/4272; H04B 10/40
See application file for complete search history.

(56) References Cited

U.S. PATENT DOCUMENTS

| | | | |
|---|---|---|---|
| 6,859,470 B2 * | 2/2005 | Fu | G02B 6/4273 372/36 |
| 11,275,223 B1 * | 3/2022 | Lin | G02B 6/4246 |
| 11,774,693 B2 * | 10/2023 | Yu | H05K 7/20336 385/92 |
| 2021/0239926 A1 * | 8/2021 | Yamamoto | H05K 7/2039 |
| 2022/0283054 A1 * | 9/2022 | Iwasaki | G01M 11/3136 |

FOREIGN PATENT DOCUMENTS

JP      2007079283 A  *  3/2007

* cited by examiner

*Primary Examiner* — Omar R Rojas
(74) *Attorney, Agent, or Firm* — Grossman Tucker Perreault & Pfleger, PLLC

(57) ABSTRACT

An optical transceiver includes a housing, an optical communication module and a heat dissipation module. The optical communication module includes a substrate, a first optical communication component and a second optical communication component located at opposite sides of the substrate, respectively. The heat dissipation module includes a first heat conductive component and a second heat conductive component disposed on the substrate. The first heat conductive component is spatially spaced apart from the second heat conductive component. The first optical communication component is supported on and in thermal contact with the first heat conductive component. The second optical communication component is mounted on the substrate, and the second optical communication component is in thermal contact with the second heat conductive component through the substrate.

19 Claims, 7 Drawing Sheets

… (1) …

OPTICAL TRANSCEIVER WITH SEPARATED HEAT DISSIPATION COMPONENTS

BACKGROUND

1. Technical Field

The present disclosure relates to an optical transceiver, more particularly to an optical transceiver having separated heat dissipation components.

2. Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. Different form factors such as XFP (10 Gigabit Small Form Factor Pluggable) used in 10 GB/s communication rate, QSFP (Quad Small Form-factor Pluggable), or others (for example, QSFP28) at different communication rates have been made available. Discrete optical transceivers or components thereof are even integrated into a single chip in order to meet the demand for much higher speeds.

As to the optical components in a conventional optical transceiver, a circuit board is disposed in a housing, and a TOSA (Transmitter optical sub-assembly) as well as a ROSA (Receiver optical sub-assembly) are mounted on the circuit board.

SUMMARY

According to one aspect of the present disclosure, an optical transceiver includes a housing, an optical communication module accommodated in the housing, and a heat dissipation module including a first heat conductive component and a second heat conductive component. The optical communication module includes a substrate, a first optical communication component and a second optical communication component. The first optical communication component and the second optical communication component are provided at opposite sides of the substrate, respectively. The first heat conductive component and the second heat conductive component re disposed on the substrate. The first heat conductive component is spatially spaced apart from the second heat conductive component, the first optical communication component is supported on and in thermal contact with the first heat conductive component, the second optical communication component is mounted on the substrate, and the second optical communication component is in thermal contact with the second heat conductive component through the substrate.

According to another aspect of the present disclosure, an optical transceiver includes a housing, an optical communication module accommodated in the housing, and a heat dissipation module including a first heat conductive component and a second heat conductive component. The optical communication module includes a substrate and two optical communication components. The first heat conductive component and the second heat conductive component are in thermal contact with each other through the substrate. The first heat conductive component is spatially spaced apart from the second heat conductive component, the two optical communication components is in thermal contact with both the first heat conductive component and the second heat conductive component, and a thermal conductivity of the first heat conductive component is higher than a thermal conductivity of the second heat conductive component.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
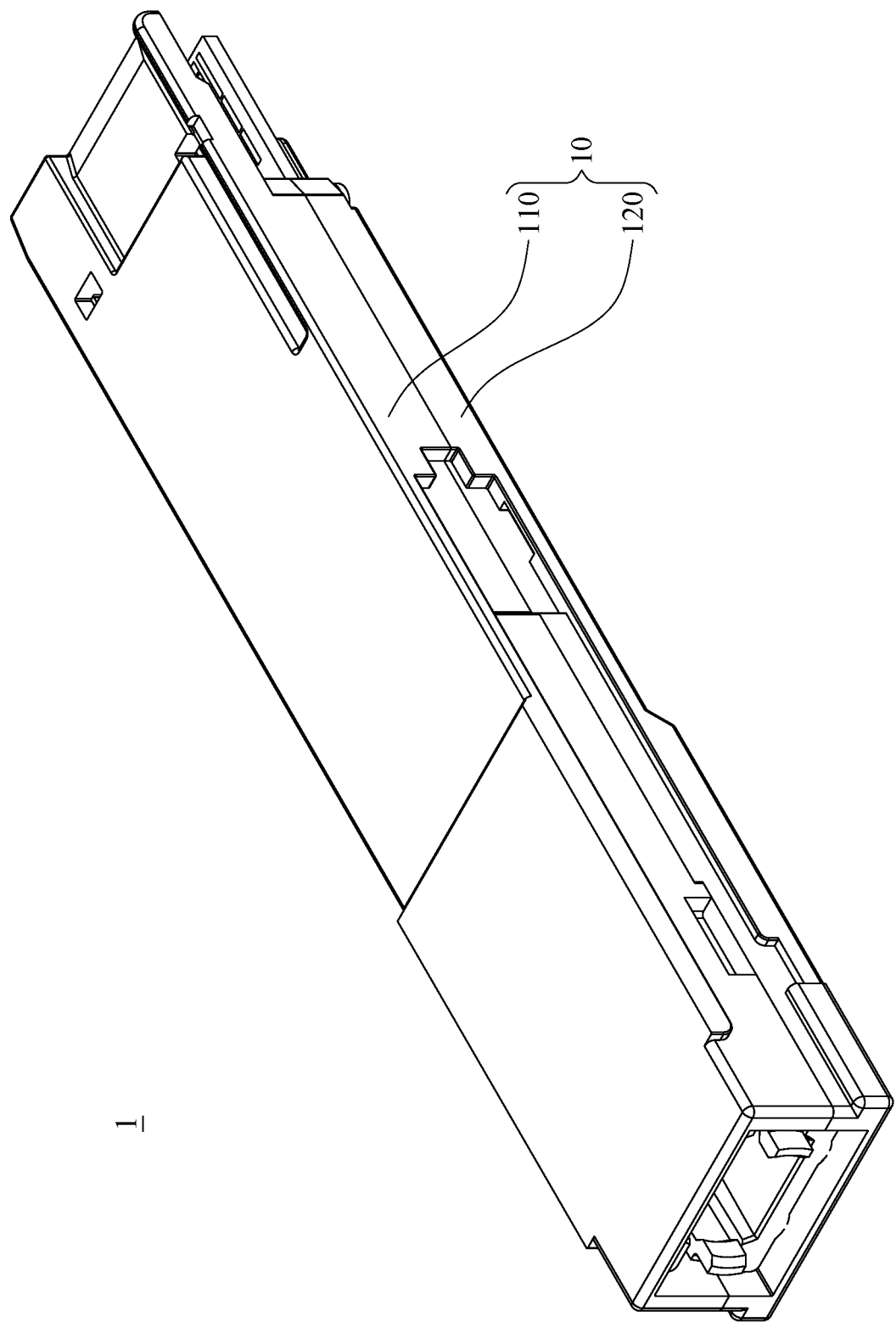
FIG. 1 is a perspective view of an optical transceiver according to one embodiment of the present disclosure.
Figure 2:
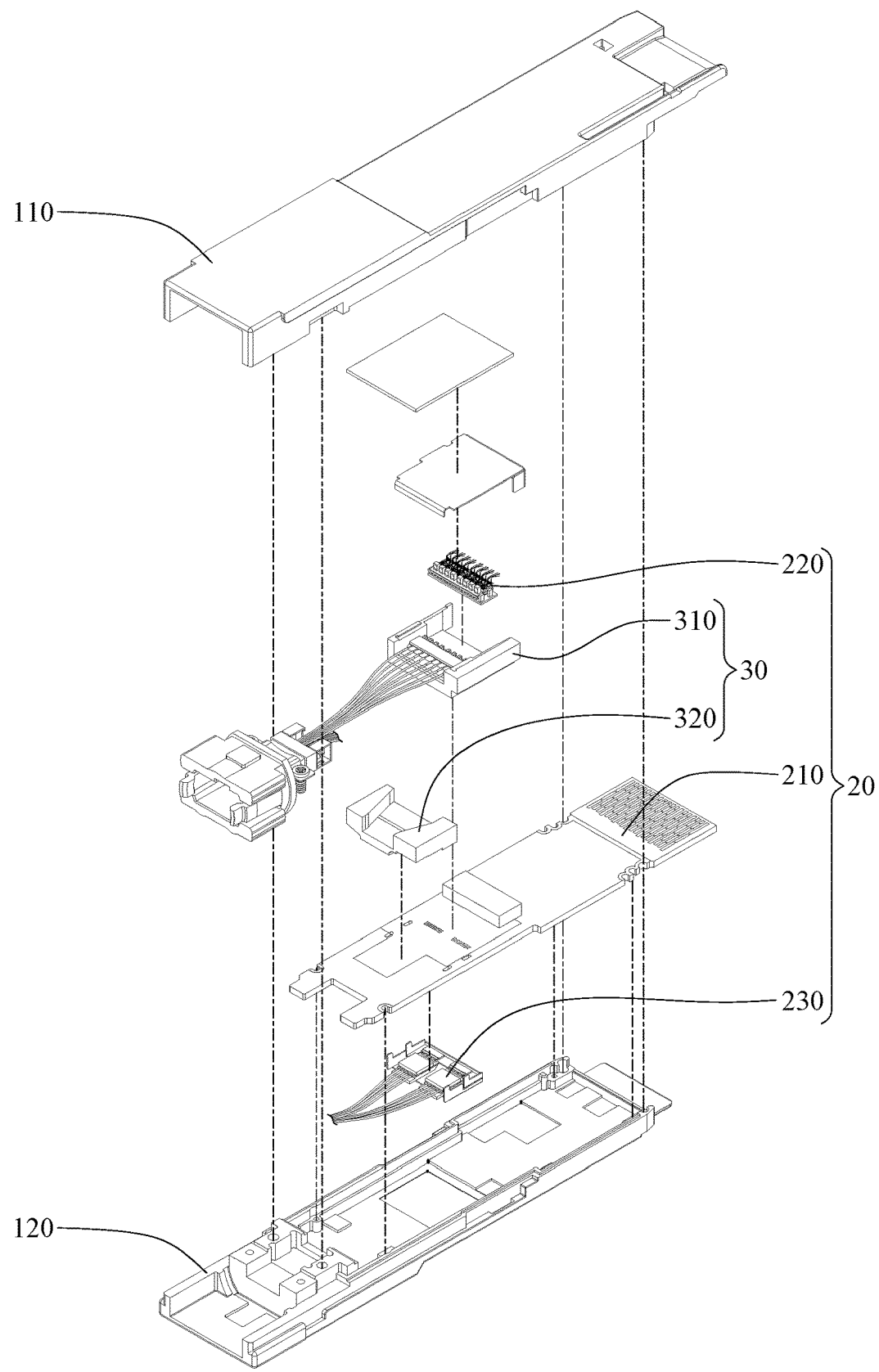
FIG. 2 is an exploded view of the optical transceiver in FIG. 1.
Figure 3:
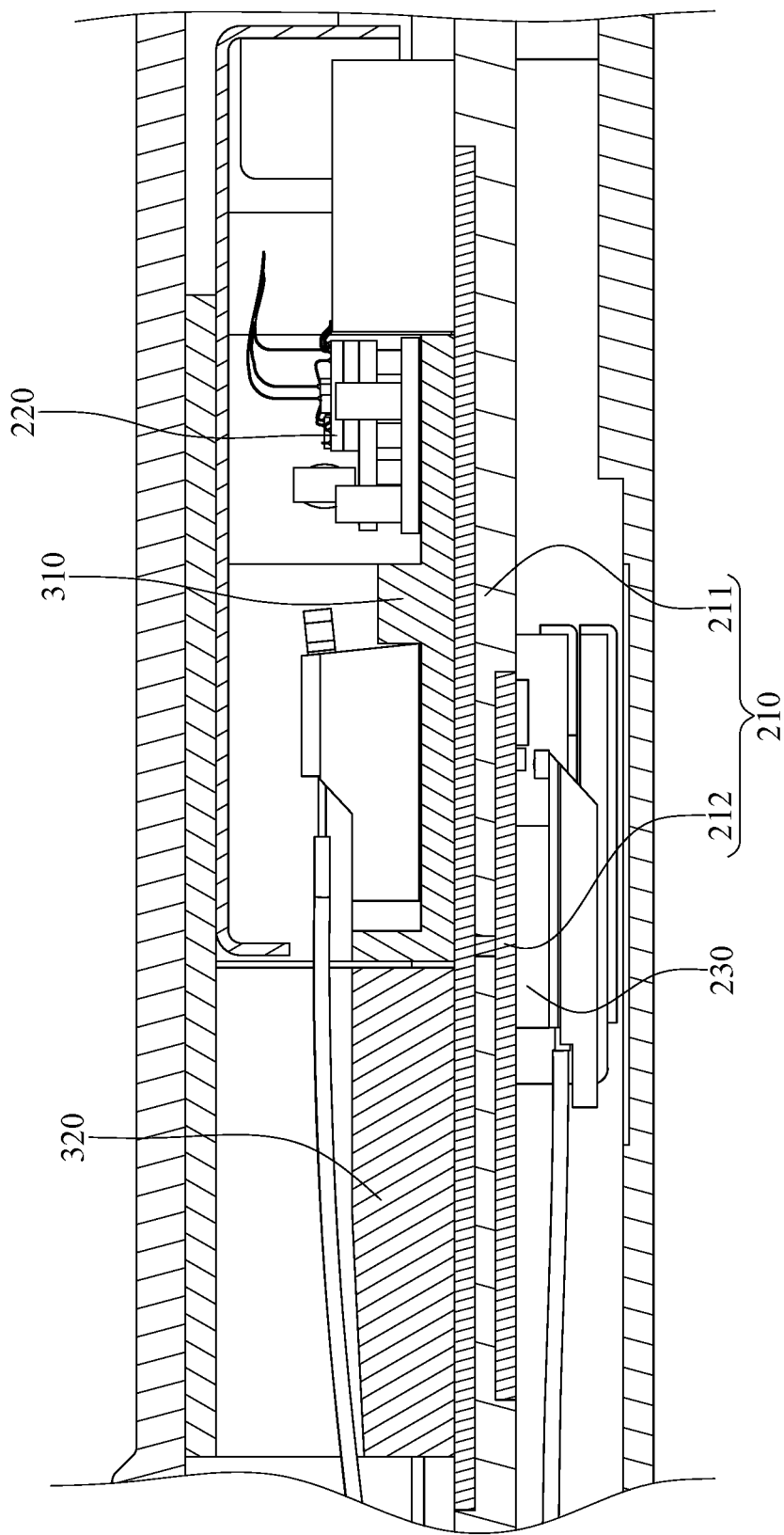
FIG. 3 is a cross-sectional view of the optical transceiver in FIG. 1.
Figure 4:
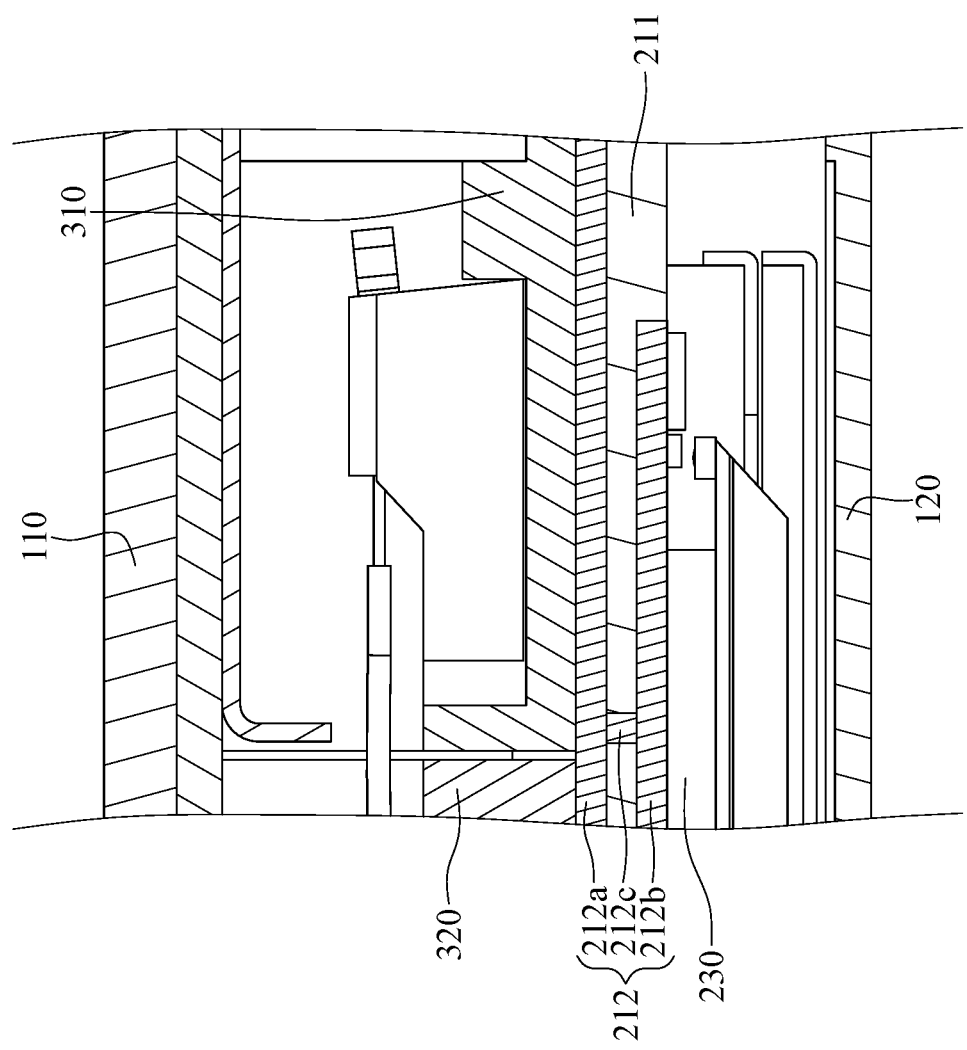
FIG. 4 is a partially enlarged view of the optical transceiver in FIG. 3.

Please refer to FIG. 1 through FIG. 4. FIG. 1 is a perspective view of an optical transceiver according to one embodiment of the present disclosure. FIG. 2 is an exploded view of the optical transceiver in FIG. 1. FIG. 3 is a cross-sectional view of the optical transceiver in FIG. 1. FIG. 4 is a partially enlarged view of the optical transceiver in FIG. 3. In this embodiment, an optical transceiver 1 may include a housing 10, an optical communication module 20 and a heat dissipation module 30.

The housing 10 includes an upper cover 110 and a lower cover 120 which are assembled together. The housing 10 may be configured to be inserted into a cage in pluggable manner for optical communication.

The optical communication module 20 is accommodated in the housing, and the optical communication module 20 may include a substrate 210, a first optical communication component 220 and a second optical communication component 230. The substrate 210, for example, is a circuit board accommodated in the housing 10. The first optical communication component 220 and the second optical communication component 230 are located at opposite sides of the substrate 210, respectively. Specifically, the first optical communication component 220 is located between the substrate 210 and the upper cover 110 of the housing 10, and the second optical communication component 230 is located between the substrate 210 and the lower cover 120 of the housing 10. In this embodiment, the first optical communication component 220 is a transmitter optical sub-assembly (TOSA) which may include a laser diode (LD) and a monitor photodiode (MPD), and the second optical communication component 230 is a receiver optical sub-assembly (ROSA) which may include a photodiode and a trans-impedance amplifier (TIA). The first optical communication component 220 and the second optical communication component may be electrically connected with a driver IC chip (not shown in the drawings) mounted on the substrate 210. It is worth noting that several other active optical components may be considered the first optical communication component 220 or the second optical communication component 230 in some other embodiments.

As shown in FIG. 3 and FIG. 4, the substrate 210 may include a non-conductive base 211 and a metal layer 212. In this embodiment, the metal layer 212 includes a first portion 212a, a second portion 212b and a thermal via 212c. The first portion 212a may be a copper pour formed on a top surface of the non-conductive base 211 facing the upper cover 110, and the second portion 212b may be another copper pour formed on a bottom surface of the non-conductive base 211 opposite to the top surface and facing the lower cover 120. In other words, in one implementation, the first portion 212a and the second portion 212b may be at opposite sides of the substrate 210, respectively. The thermal via 212c may be a metal film embedded in the non-conductive base 211, and connects the first portion 212a with the second portion 212b. The first optical communication component 220 may be disposed above the top surface of the non-conductive base 211, the second optical communication component 230 may be mounted on the bottom surface of the non-conductive base 211. The second optical communication component 230 may be in thermal contact with the metal layer 212 by physically touching the second portion 212b in direct or indirect manner. When the second optical communication component 230 is in indirect thermal contact with the second portion 212b, a graphite sheet or a thermal paste may be provided between the metal layer 212 and the second optical communication component 230.

The heat dissipation module 30 may include a first heat conductive component 310 and a second heat conductive component 320 disposed on the same surface of the substrate 210 and in thermal contact with the housing 10. In this embodiment, the first heat conductive component and the second heat conductive component are two independent metallic elements separately mounted on the substrate 210 and indirectly connected with each other through the substrate 210. Specifically, as shown in FIG. 3, in a space defined between the substrate 210 and the upper cover 110 of the housing 10, each of the first heat conductive component 310 and the second heat conductive component 320 is located between the substrate 210 and the upper cover 110, and the first heat conductive component 310 is spatially spaced apart from the second heat conductive component 320. At the same time, the first heat conductive component 310 is in thermal contact with the second heat conductive component 320 through the metal layer 212 of the substrate 210. Such thermal connection can be achieved by causing the first heat conductive component 310 and the second heat conductive component 320 to be in directly or indirectly physical contact with the first portion 212a of the metal layer 212.

The first optical communication component 220 of the optical communication module 20 may be supported on and in thermal contact with the first heat conductive component 310. Specifically, the first optical communication component 220 may physically touch the first heat conductive component 310 to be located above the substrate 210. Furthermore, the first optical communication component 220 may be in thermal contact with the second heat conductive component 320 through the first heat conductive component 310 and the first portion 212a of the metal layer 212 of the substrate 210.

The second optical communication component 230 may be mounted on the substrate 210 to physically touch the metal layer 212, and the second optical communication component 230 may be in thermal contact with the first heat conductive component 310 and the second heat conductive component 320 through the substrate 210. Specifically, the second optical communication component 220 may be in thermal contact with the first and second heat conductive components 310 and 320 through the second portion 212b, the thermal via 212c and the first portion 212a of the metal layer 212 of the substrate 210.

In FIG. 3 and FIG. 4, the first optical communication component 220 and the second optical communication component 230 are located at opposite sides of the substrate 210, respectively, and the first heat conductive component 310 and the second heat conductive component 320 are at the same surface of the substrate 210. In another implementation, however, the two optical communication components such as 220 and 230 might be located at the same side of the substrate or the two heat conductive components such as 310 and 320 might be at different sides of the substrate. Also, despite the first optical communication component 220 is supported on the first heat conductive component 310 in FIG. 3, the same first optical communication component might be mounted on the substrate and in thermal contact with the first heat conductive component through copper pour in some other embodiments.

The first heat conductive component 310 may have a higher thermal conductivity than the second heat conductive component 320. Specifically, the thermal conductivity of the first heat conductive component 310 is at least 1.5 times higher than that of the second heat conductive component 320. Besides, in order to ensure the optical coupling efficiency of the first optical communication component 220, the first heat conductive component 310 may have a lower thermal expansion coefficient than the second heat conductive component 320, and may be made of high hardness material such as tungsten copper alloy.

Figure 5:
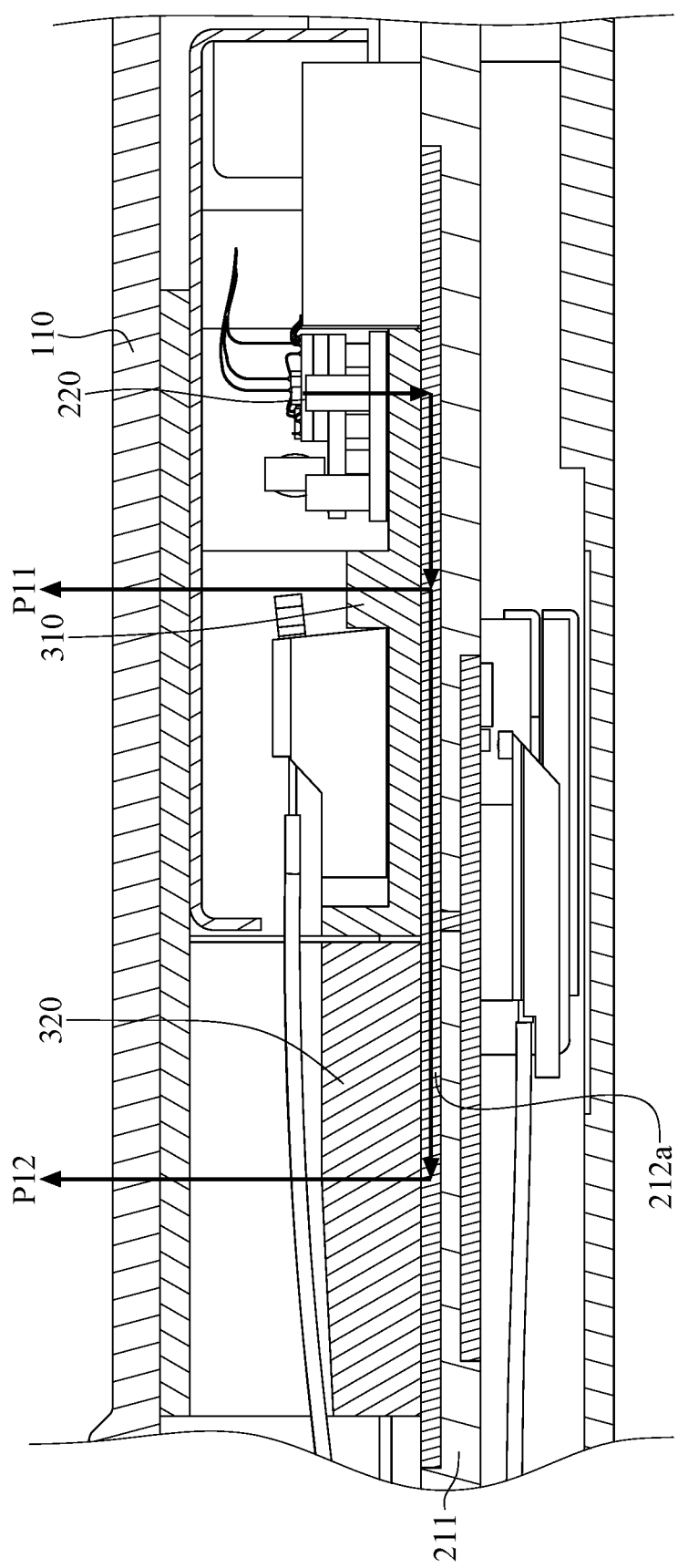
FIG. 5 and FIG. 6 are schematic views showing heat transfer pathway of the optical transceiver in FIG. 3.
Figure 6:
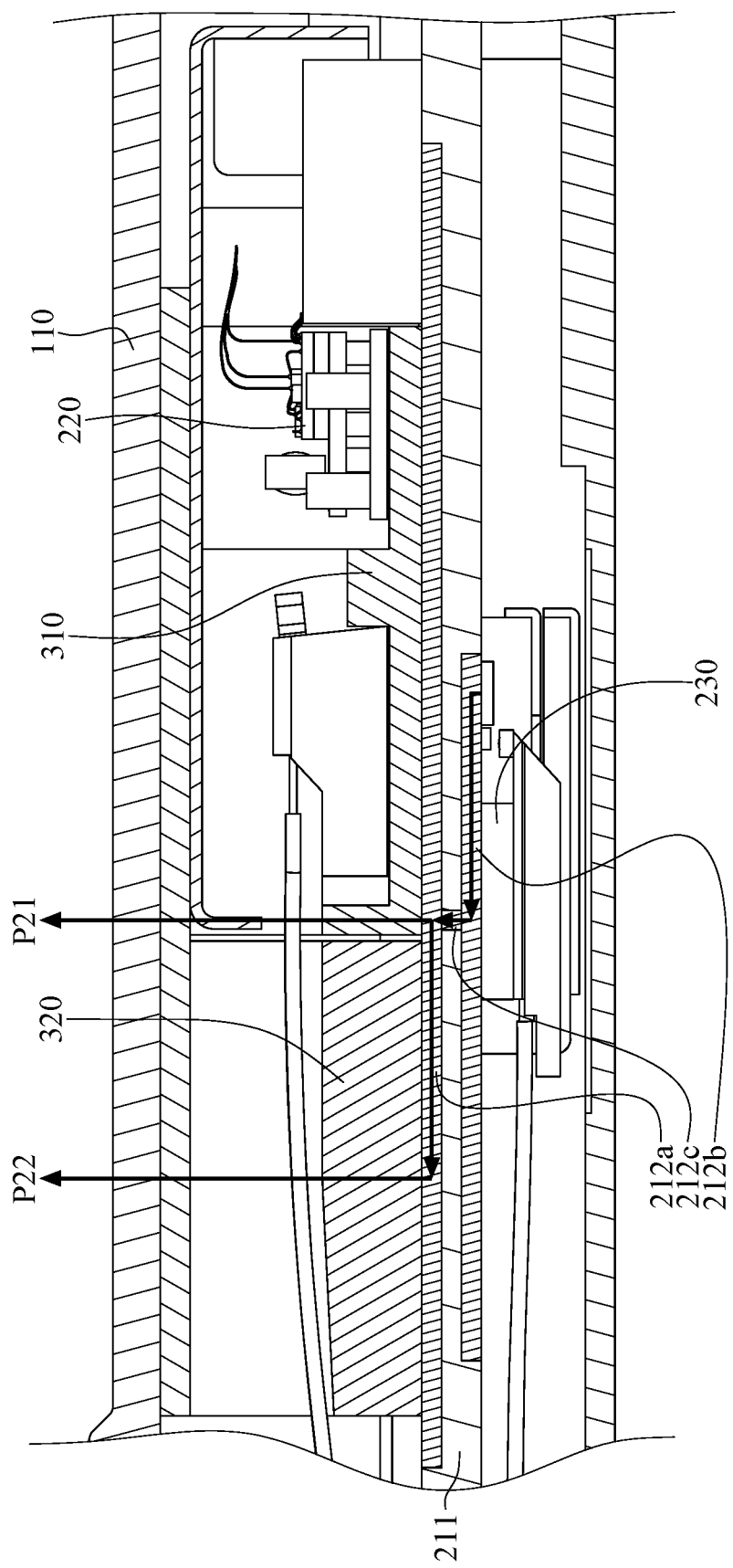

FIG. 5 and FIG. 6 are schematic views showing heat transmission paths of the optical transceiver in FIG. 3. Symbols P11 and P12 each represents a heat transmission path from the first optical communication component 220 to the upper cover 110 of the housing 10, and Symbols P21 and P22 each represents a heat transmission path from the second optical communication component 230 to the upper cover 110 of the housing 10. It is worth noting that the heat transmission paths might be through the upper cover 110 of the housing 10 so as to fully employ fin-shaped heat sink located on the top surface of a cage into which the optical transceiver of the present disclosure is inserted.

The first and second optical communication components 220 and 230 are supposed to generate heat during their operation, and such heat is transmitted through the first heat conductive component 310 and the second heat conductive component 320 to reach the upper cover 110. In detail, as shown by the heat transmission path P11 in FIG. 5, notwithstanding the percentage the heat generated by the first optical communication component 220 is transmitted to the upper cover 110 through the first heat conductive component 310 and/or through the first heat conductive component 310, the first portion 212a of the metal layer 212 and the second heat conductive component 320 as indicated by P12. Since the first heat conductive component 310 has higher thermal conductivity than the second heat conductive component 320 and P11 is shorter than P12 in terms of the travelling distance, most amount of the heat generated by the first optical communication component 220 may be transmitted along the heat transmission path P11.

As shown in FIG. 6, heat generated by the second optical communication component 230 is also guided to the upper cover 110 through the second portion 212b, the thermal via 212c, the first portion 212a of the metal layer 212 and the first heat conductive component 310 along the heat transmission path P21 and/or through the second portion 212b, the thermal via 212c, the first portion 212a of the metal layer 212 and the second heat conductive component 320 along the heat transmission path P22. Since the first heat conductive component 310 may have higher temperature than the second heat conductive component 320 due to heat provided by the first optical communication component 220, most amount of the heat generated by the second heat conductive component 320 may be transmitted along the heat transmission path P22.

Figure 7:
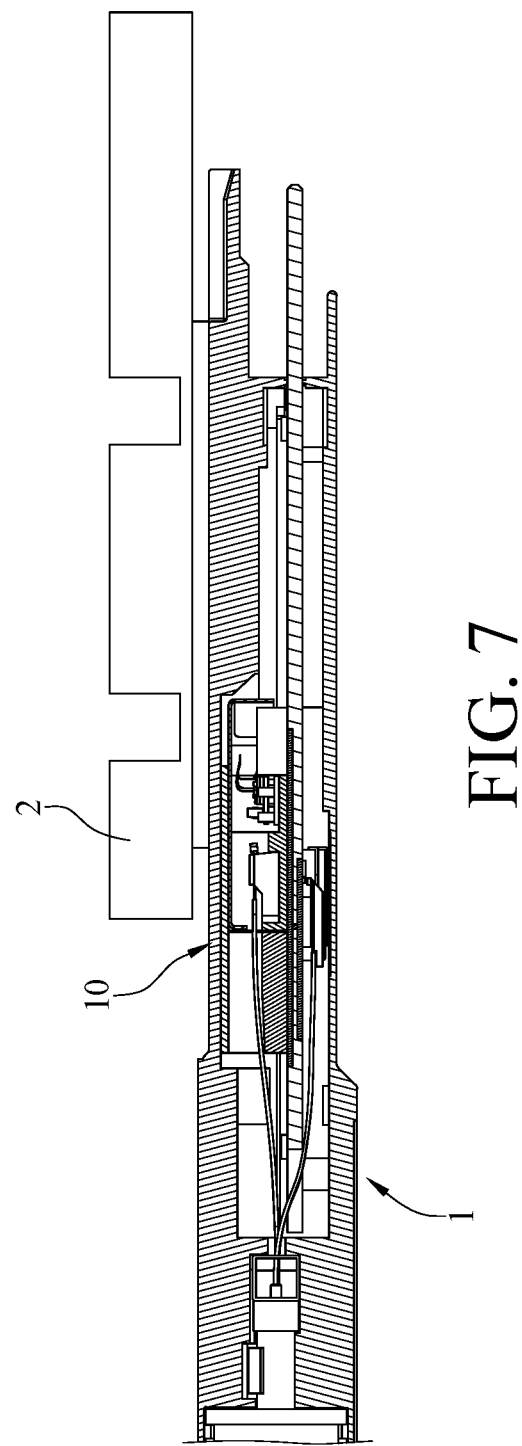
FIG. 7 is a schematic view showing the optical transceiver in FIG. 1 where a heat sink is provided.

FIG. 7 is a schematic view showing the optical transceiver in FIG. 1 where a heat sink is provided. A heat sink 2 may be in thermal contact with the optical transceiver 1. The heat sink 2 may be a copper board or include multiple fins. The heat generated by the components inside the housing 10 might be transmitted to the upper cover 110 of the housing 10 allowing for the heat sink 2 to properly dissipate the heat from the optical transceiver 1.

As to devices for high-speed communication such as QSFP-DD 800G optical transceiver, since some active components such as TOSA would be operating at higher frequencies and therefore generating much more heat in the process. Thus, a single metallic element is insufficient for dissipating the excessive amount of the heat, which may in turn cause the generated heat to even accumulate within the housing (or more precisely in the same heat dissipation component) and therefore fail heat dissipation efficiency requirements.

According to the present disclosure, two independent heat conductive components are provided in the optical transceiver, and the two heat conductive components are spatially spaced apart from each other. One heat conductive component can dissipate the heat generated by an element generating large amount of heat, such as a TOSA for 800G optical communication networks, and the other heat conductive component can dissipate heat generated by an element generating relatively smaller amount of heat (such as a ROSA).

In some cases, the two heat conductive components are in thermal contact with each other, allowing some optical communication components generating larger amount of the heat to be in thermal contact with both of the heat conductive components. Thus, the two heat conductive components can share the burden of the heat dissipation with each other to prevent any heat accumulation in any heat conductive component. When one of the heat conductive components has higher thermal conductivity than the other one, such heat conductive component could be primarily responsible for the heat dissipation while the other (or the one with the lower thermal conductivity) might handle less amount of the heat generated over the course of the operation of the optical transceiver.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, comprising:
a housing;
an optical communication module accommodated in the housing, wherein the optical communication module comprises a substrate, a first optical communication component and a second optical communication component, and the first optical communication component and the second optical communication component are provided at opposite top and bottom surfaces of the substrate, respectively; and
a heat dissipation module comprising a first heat conductive component and a second heat conductive component disposed on and in physical contact with the substrate, wherein the first heat conductive component is spatially spaced apart from the second heat conductive component, the first optical communication component is supported on and in thermal contact with the first heat conductive component, the second optical communication component is mounted on the substrate, and the second optical communication component is in thermal contact with the second heat conductive component through the substrate.

2. The optical transceiver according to claim 1, wherein each of the first heat conductive component and the second heat conductive component is provided between the substrate and an upper cover of the housing.

3. The optical transceiver according to claim 1, wherein the first heat conductive component and the second heat conductive component are in thermal contact with each other.

4. The optical transceiver according to claim 1, wherein the substrate comprises a metal layer, the first heat conductive component is in thermal contact with the second heat conductive component through the metal layer, and the second optical communication component is in thermal contact with the second heat conductive component through the metal layer.

5. The optical transceiver according to claim 4, wherein the metal layer comprises a first portion and a second portion connected with each other and at opposite sides of the substrate, the first heat conductive component and the second heat conductive component physically touches the first portion, and the second optical communication component physically touches the second portion.

6. The optical transceiver according to claim 5, wherein the metal layer comprises a copper pour.

7. The optical transceiver according to claim 1, wherein a thermal conductivity of the first heat conductive component is higher than a thermal conductivity of the second heat conductive component.

8. The optical transceiver according to claim 7, wherein the thermal conductivity of the first heat conductive component is at least 1.5 times higher than the thermal conductivity of the second heat conductive component.

9. The optical transceiver according to claim 1, wherein a thermal expansion coefficient of the first heat conductive component is lower than a thermal expansion coefficient of the second heat conductive component.

10. The optical transceiver according to claim 1, wherein each of the first heat conductive component and the second heat conductive component is in thermal contact with the housing.

11. The optical transceiver according to claim 1, wherein the optical transceiver is a QSFP-DD 800G transceiver with the first optical communication component being a TOSA and the second optical communication component being a ROSA.

12. An optical transceiver, comprising:
a housing;
an optical communication module accommodated in the housing, wherein the optical communication module comprises a substrate and two optical communication components; and
a heat dissipation module comprising a first heat conductive component and a second heat conductive component in physical contact with the substrate and in thermal contact with each other through the substrate, wherein the first heat conductive component is spatially spaced apart from the second heat conductive component, and the two optical communication components is in thermal contact with both the first heat conductive component and the second heat conductive component, wherein the two optical communication components are provided at opposite top and bottom surfaces of the substrate, respectively, one of the two optical communication components is supported on the first heat conductive component, and the other one of the two optical communication components is mounted on the substrate.

13. The optical transceiver according to claim 12, wherein the thermal conductivity of the first heat conductive component is at least 1.5 times higher than the thermal conductivity of the second heat conductive component.

14. The optical transceiver according to claim 12, wherein each of the first heat conductive component and the second heat conductive component is provided between the substrate and an upper cover of the housing.

15. The optical transceiver according to claim 12, wherein the substrate comprises a metal layer, the first heat conductive component is in thermal contact with the second heat conductive component through the metal layer, and the two optical communication components are in thermal contact with the second heat conductive component through the metal layer.

16. The optical transceiver according to claim 15, wherein the metal layer comprises a copper pour.

17. The optical transceiver according to claim 12, wherein a thermal expansion coefficient of the first heat conductive component is lower than a thermal expansion coefficient of the second heat conductive component.

18. The optical transceiver according to claim 12, wherein each of the first heat conductive component and the second heat conductive component is in thermal contact with the housing.

19. The optical transceiver according to claim 12, wherein the optical transceiver is a QSFP-DD 800G transceiver with the two optical communication components being a TOSA and a ROSA, respectively.

\* \* \* \* \*